United States Patent
Nagarajan et al.

(10) Patent No.: US 8,321,840 B2
(45) Date of Patent: Nov. 27, 2012

(54) SOFTWARE FLOW TRACKING USING MULTIPLE THREADS

(75) Inventors: Vijayanand Nagarajan, Riverside, CA (US); Ho-Seop Kim, Austin, TX (US); Youfeng Wu, Palo Alto, CA (US); Rajiv Gupta, Tucson, AZ (US)

(73) Assignee: Intel Corporation, Santa Clara, CA (US)

( * ) Notice: Subject to any disclaimer, the term of this patent is extended or adjusted under 35 U.S.C. 154(b) by 1360 days.

(21) Appl. No.: 11/965,271

(22) Filed: Dec. 27, 2007

(65) Prior Publication Data

US 2009/0172644 A1    Jul. 2, 2009

(51) Int. Cl.
*G06F 9/44* (2006.01)
(52) U.S. Cl. .................. 717/126; 717/106; 717/130
(58) Field of Classification Search .................... None
See application file for complete search history.

(56) References Cited

U.S. PATENT DOCUMENTS

| | | | | |
|---|---|---|---|---|
| 6,131,183 A * | 10/2000 | Tyler | .............. | 717/106 |
| 6,832,367 B1 * | 12/2004 | Choi et al. | ............ | 717/130 |
| 7,117,389 B2 * | 10/2006 | Luick | ............... | 714/11 |
| 7,134,124 B2 * | 11/2006 | Ohsawa et al. | ........ | 718/100 |
| 7,272,820 B2 * | 9/2007 | Klianev | ........ | 717/106 |
| 7,293,251 B2 * | 11/2007 | Zeman et al. | ........ | 717/100 |
| 7,321,965 B2 * | 1/2008 | Kissell | ........ | 712/229 |
| 7,370,319 B2 * | 5/2008 | Pensak et al. | ........ | 717/130 |
| 7,386,839 B1 * | 6/2008 | Golender et al. | ........ | 717/130 |
| 7,398,521 B2 * | 7/2008 | Hoflehner et al. | ........ | 717/151 |
| 7,496,901 B2 * | 2/2009 | Begg et al. | ........ | 717/130 |
| 7,512,826 B2 * | 3/2009 | Armstrong et al. | ........ | 713/375 |
| 7,523,465 B2 * | 4/2009 | Aamodt et al. | ........ | 719/320 |
| 7,757,282 B2 * | 7/2010 | Pandit et al. | ........ | 726/22 |
| 7,814,469 B2 * | 10/2010 | Wang et al. | ........ | 717/161 |
| 7,818,547 B2 * | 10/2010 | Aamodt et al. | ........ | 712/220 |
| 7,823,135 B2 * | 10/2010 | Horning et al. | ........ | 717/126 |
| 7,870,610 B1 * | 1/2011 | Mitchell et al. | ........ | 726/23 |
| 7,950,012 B2 * | 5/2011 | Tirumalai et al. | ........ | 718/102 |
| 8,225,290 B2 * | 7/2012 | Pensak et al. | ........ | 717/126 |
| 2002/0040470 A1 * | 4/2002 | Guthrie et al. | ........ | 717/126 |
| 2003/0088854 A1 * | 5/2003 | Wygodny et al. | ........ | 717/130 |
| 2003/0208743 A1 * | 11/2003 | Chong et al. | ........ | 717/106 |
| 2005/0066079 A1 * | 3/2005 | Luick | ........ | 710/36 |
| 2005/0071438 A1 * | 3/2005 | Liao et al. | ........ | 709/214 |
| 2005/0081018 A1 * | 4/2005 | Luick | ........ | 712/218 |

(Continued)

OTHER PUBLICATIONS

Chabbi, "Efficient Taint Analysis Using Multicore Machines", Jul. 2007, Published on the website of University of Arizona. [retrieved on Sep. 12, 2011]; Retrieved from Internet <URL:https:/www.cs.arizona.edu/solar/papers/milind.thesis.pdf>; pp. 1-60.*

(Continued)

*Primary Examiner* — Thuy Dao
*Assistant Examiner* — Xi D Chen
(74) *Attorney, Agent, or Firm* — Trop, Pruner & Hu, P.C.

(57) ABSTRACT

Methods, systems and machine readable media are disclosed for performing dynamic information flow tracking. One method includes executing operations of a program with a main thread, and tracking the main thread's execution of the operations of the program with a tracking thread. The method further includes updating, with the tracking thread, a taint value associated with the value of the main thread to reflect whether the value is tainted, and determining, with the tracking thread based upon the taint value, whether use of the value by the main thread violates a specific security policy.

18 Claims, 3 Drawing Sheets

U.S. PATENT DOCUMENTS

| | | | |
|---|---|---|---|
| 2005/0223199 A1* | 10/2005 | Grochowski et al. | 712/235 |
| 2005/0235136 A1* | 10/2005 | Barsotti et al. | 713/1 |
| 2006/0101410 A1* | 5/2006 | Massarenti et al. | 717/126 |
| 2007/0240141 A1 | 10/2007 | Qin et al. | |
| 2009/0013329 A1* | 1/2009 | May et al. | 719/313 |
| 2009/0276754 A1* | 11/2009 | Lind et al. | 717/106 |
| 2009/0313600 A1* | 12/2009 | Ayers et al. | 717/106 |
| 2010/0088681 A1* | 4/2010 | Wang et al. | 717/126 |

OTHER PUBLICATIONS

Haldar, et al., "Dynamic Taint Propagation for Java", Prodeedings fo the 21$^{st}$ Annual Computer Security Applications Conference, 2005;[retrieved on Sep. 13, 2011]; Retrieved from Internet <URL:https:/ieeexplore.ieee.org/stamp/stamp.jsp?tp=&arnumber=1565257>; pp. 1-9.*

Jung, et al., "Helper Thread Prefetching for Loosely-Coupled Multiprocessor Systems", 2006; [retrieved on Sep. 14, 2011]; Retrieved from Internet <URL:https:/ieeexplore.ieee.org/stamp/stamp.jsp?tp=&arnumber=1639375>; pp. 1-10.*

Chen, et al., "From Speculation to Security: Practical and Efficient INformation Flow Tracking Using Speculative Hardware", 2008 IEEE; [retrieved on Jul. 20, 2012]; Retrieved from Internet <URL:http://ieeexplore.ieee.org/stamp/stamp.jsp?tp=&arnumber=4556743>;pp. 401-412.*

Lam, Chiueh, "A General Dynamic INformation Flow Tracking Framework for Security Applications", 2006, IEEE; [retrieved on Jul. 20, 2012]; Retrieved from Internet <URL:http://ieeexplore.ieee.org/stamp/stamp.jsp?tp=&arnumber=4041190>;pp. 1-10.*

Ozsoy, et al., "SIFT: A Low-Overhead Dynamic Information Flow Tracking Architecture for SMT Processors", 2011 ACM; [retrieved on Jul. 20, 2012]; Retrieved from Internet <URL:http://dl.acm.org/citation.cfm?id=2016604>;pp. 1-11.*

Chen, et al., "Log-Based Architectures: Using Multicore to Help Software Behave Correctly", 2001, SIGOPS Operating Systems Revew; [retrieved on Jul. 20, 2012]; Retrieved from Internet <URL:http://dl.acm.org/citation.cfm?id=1945023>;pp. 84-91.*

Chen, Shuo et al., "Non-Control-Data Attacks Are Realistic Threats", Department of Computer Science, North Carolina State University, pp. 1-15.

Crandall, Jedidiah R., et al., "Minos: Control Data Attack Prevention Orthogonal to Memory Model", IEEE Computer Society. Proceedings of the 37th International Symposium on Microarchitecture (MICRO-37 2004), pp. 221-232.

Dalton, Michael et al., "Deconstructing Hardware Architectures for Security", Computer Systems Laboratory, Stanford University, pp. 1-8.

Dehnert, James C., et al., "The Transmeta Code Morphing Software: Using Speculation, Recovery, and Adaptive Retranslation to Address Real-Life Challenges", Appeared in the Proceedings for the First Annual IEEE/ACM International Symposium on Code Generation and Optimization, Mar. 27-29, 2003, San Francisco, CA, (2003),pp. 1-10.

Kiriansky, Vladimir et al., "Secure Execution Via Program Shepherding", Originally Published in the Proceedings of the 11th USENIX Security Symposium (Security 02), San Francisco, CA, Aug. 2002, pp. 1-16.

Newsome, James et al., "Dynamic Taint Analysis for Automatic Detection, Analysis, and Signature Generation of Exploits on Commodity Software", pp. 1-17.

Qin, Feng et al., "LIFT: A Low-Overhead Practical Information Flow Tracking System for Detecting Security Attacks", pp. 1-12.

Shetty, Rithin et al., "HeapMon: a Low Overhead, Automatic, and Programmable Memory Bug Detector", Appears in the Proceedings of the First IBM PAC2 Conference, pp. 1-10.

Shi, Weidong et al., "An Intrusion-Tolerant and Self-Recoverable Network Service System Using a Security Enhanced Chip Multiprocessor", pp. 263-173.

Suh, G. Edward et al., "Secure Program Execution via Dynamic Information Flow Tracking", pp. 1-14.

Vachharajani, Neil et al., "RIFLE: An Architectural Framework for User-Centric Information-Flow Security", Depts of Computer Science and Electrical Engineering; Princeton University, pp. 243-254.

Chen, Shuo et al., "Defeating Memory Corruption Attacks via Pointer Taintedness Detection", pp. 1-10.

* cited by examiner

| ORIGINAL OPERATION | INFORMATION FLOW TRACKING OPERATION |
|---|---|
| 200 — Read [Mem] | Taint-value[Mem] = 1 |
| 202 — Load Reg1, [Mem] | Taint-value[Reg1] = Taint-value[Mem] |
| 204 — Reg2 = Reg1 + 2 | Taint-value[Reg2] = Taint-value[Reg1] |
| 206 — Jmp Reg2 | If Taint-value[Reg2] == 1 exception( ); |

FIG. 2

| SOURCE CODE 400 | MAIN THREAD CODE 420 | TRACKING THREAD CODE 440 |
|---|---|---|
| void fun( ) { <br> int buf[10],choice; <br> 450 — choice = get( ); <br> <br> // bounds checking <br> 462 — if(choice > 3) exit(0); <br> ... <br> <br> 464 — buf = get( ); // vulnerability <br> ... <br> Switch(choice): <br> Case 1: <br>   F1(); <br> 460 — Case 2: <br>   F2(); <br> Case 3: <br>   F3( ); <br> } | 470 — call <get> <br> 471 — a. call sys_read <br> 472 — b. mov eax, <mem> // in sys_read <br> <br> cmp eax, 03h <br> jge <exit> — 474 <br> <br> // spill code <br> push eax <br>   — 475 <br> ... <br> call <get> — 476 <br> // un-spilling <br> pop eax <br>   — 477 <br> add eax,ebp <br> (receive and check status) <br> 478 — jmp eax <br> <br> ... <br> T1: call<f1> <br> T2: call<f2> <br> T3: call <f3> | 480 — call <get> <br> 481 — mov <mem+off.>,1 <br> mov eax,<mem+off.> <br> // detainting <br> mov eax,0 — 484 <br> (receive branch outcome) <br> <br> (receive esp' value) — 485 <br> mov <esp'+off>, eax <br> <br> call <get> — 486 <br> (receive esp' value) <br> mov eax, <esp'+off> — 487 <br> //tracking <br> or eax,ebp <br> //checking <br> cmp eax,01h — 488 <br> jnz label <br>   raise exception <br> label: <br> ... <br> ... |

FIG. 4

SOFTWARE FLOW TRACKING USING MULTIPLE THREADS

BACKGROUND

As computer systems become more complex, security is becoming a greater concern. Authorization and privacy are two concerns within the security domain. Authorization issues are related to unauthorized access to computer systems or privilege escalation within a system via exploitation of holes in software. Privacy issues are related to access to sensitive data and leaking of such data via access control security holes or propagation.

In an effort to resolve security issues, dynamic information flow tracking has been used to protect systems from authorization violations and compromised privacy. Such flow tracking is typically implemented using a hardware-based approach. These approaches typically include additional hardware support for performing tracking of secure data throughout its lifetime in a system. As an example, data may be tagged with a sensitivity level, which may be located in the dedicated hardware support. During program execution, the system dynamically propagates the sensitivity level for the tagged data and detects violations of user-specified rules. However, by implementing dynamic information flow tracking using a hardware-based approach, legacy systems lacking such specialized hardware cannot perform dynamic information flow tracking. Furthermore, there is added expense and computation complexity in performing a hardware-based dynamic information flow tracking process.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 2 shows illustrative information flow tracking code generated by the compiler of FIG. 1.

FIG. 4 shows illustrative information flow tracking code using a main thread and a tracking thread.

DETAILED DESCRIPTION OF THE DRAWINGS

Figure 1:
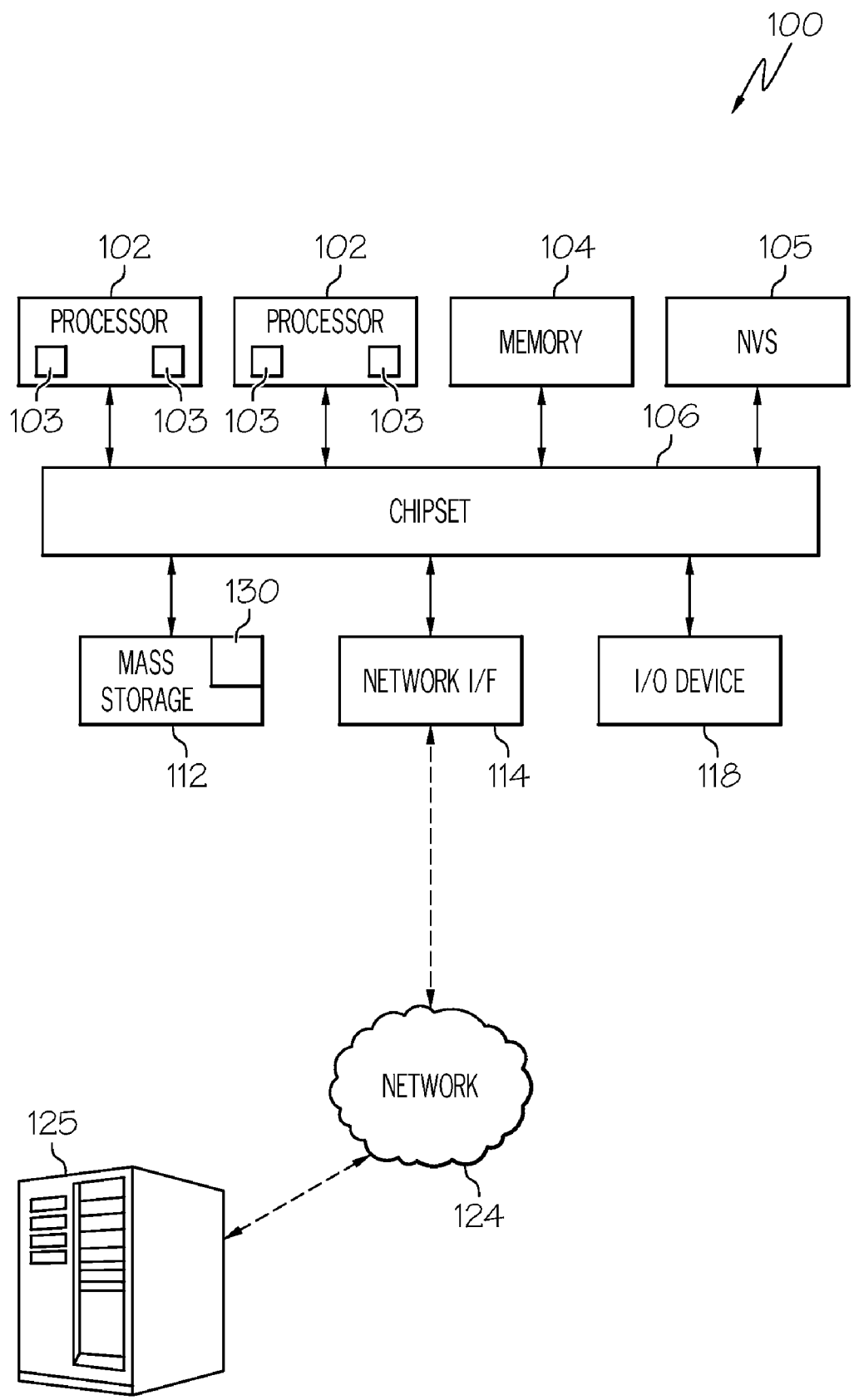
FIG. 1 shows an illustrative computing device having a compiler for generating information flow tracking code.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

Referring now to FIG. 1, one embodiment of a computing device 100 is shown. The computing device 100 may include one or more processors 102 and a memory 104 coupled to a chipset 106. A mass storage device 112, a non-volatile storage (NVS) device 105, a network interface (I/F) 114, and an Input/Output (I/O) device 118 may also be coupled to the chipset 106. Embodiments of computing device 100 include, but are not limited to, a desktop computer, a notebook computer, a server, a personal digital assistant, a network workstation, or the like. In one embodiment, the processor 102 may execute instructions stored in memory 104.

The processors 102 may include, but are not limited to, processors manufactured or marketed by Intel Corp., IBM Corp., and Sun Microsystems Inc. In one embodiment, computing device 100 may include multiple processors 102. The processors 102 may also include multiple processing cores 103. Thus, the computing device 100 may include multiple processing cores 103 for executing binary code of the computing device 100 as a result of having multiple single core processors 102, a single multi-core processor, and/or a combination of single core and multi-core processors 102. Furthermore, each processing core 103 may support simultaneous execution of multiple threads.

The memory 104 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), or the like. In one embodiment, the memory 104 may include one or more memory units that do not have to be refreshed.

The chipset 106 may include a memory controller, such as a Memory Controller Hub (MCH), an input/output controller, such as an Input/Output Controller Hub (ICH), or the like. In an alternative embodiment, a memory controller for memory 104 may reside in the same chip as processor 102. The chipset 106 may also include system clock support, power management support, audio support, graphics support, or the like. In one embodiment, chipset 106 is coupled to a board that includes sockets for processor 102 and memory 104.

The components of computing device 100 may be connected by various interconnects. In one embodiment, an interconnect may be point-to-point between two components, while in other embodiments, an interconnect may connect more than two components. Such interconnects may include a Peripheral Component Interconnect (PCI), such as PCI Express, a System Management bus (SMBUS), a Low Pin Count (LPC) bus, a Serial Peripheral Interface (SPI) bus, an Accelerated Graphics Port (AGP) interface, or the like. I/O device 118 may include a keyboard, a mouse, a display, a printer, a scanner, or the like.

The computing device 100 may interface to external systems through network interface 114. The network interface 114 may include, but is not limited to, a modem, a Network Interface Card (NIC), or other interfaces for coupling a computing device to other computing devices. A carrier wave signal 123 may be received/transmitted by network interface 114. In the embodiment illustrated in FIG. 1, carrier wave signal 123 is used to interface computing device 100 with a network 124, such as a Local Area Network (LAN), a Wide Area Network (WAN), the Internet, or any combination thereof. In one embodiment, network 124 is further coupled to a computing device 125 such that computing device 100 and computing device 125 may communicate over network 124.

The computing device 100 also includes non-volatile storage 105 on which firmware and/or data may be stored. Non-volatile storage devices include, but are not limited to, Read-Only Memory (ROM), Flash memory, Erasable Programmable Read Only Memory (EPROM), Electronically Erasable Programmable Read Only Memory (EEPROM), Non-Volatile Random Access Memory (NVRAM), or the like.

The mass storage 112 may include, but is not limited to, a magnetic disk drive, such as a hard disk drive, a magnetic tape drive, an optical disk drive, or the like. It is appreciated that instructions executable by processor 102 may reside in mass storage 112, memory 104, non-volatile storage 105, or may be transmitted or received via network interface 114.

In one embodiment, the computing device 100 may execute an Operating System (OS). Embodiments of an OS include Microsoft Windows®, the Apple Macintosh operating system, the Linux operating system, the Unix operating system, or the like.

The computing device 100 may also execute a compiler 130. In one embodiment, the compiler 130 may dynamically translate and optimize source code at runtime. For example, the compiler 130 may be implemented as part of a Java Virtual Machine environment in which Java source code files are dynamically compiled and executed by the computing device 100 using Just-In-Time (JIT) compiler techniques. The compiler 130 may also be implemented as part of a dynamic binary translator that may read statically compiled native code or byte code files and dynamically translate the code to add functionality, compatibility, and/or optimizations to the code. The compiler 130 may also be implemented as part of a static compiler that reads, compiles and optimizes source code such as C source code files to obtain compiled binary code for later execution by the computing device 100 or another computing device.

Whether the compiler 130 is implemented as a Just-In-Time compiler, static compiler, and/or dynamic binary translator, the compiler 130 may generate code that results in dynamic information flow tracking. Dynamic information flow tracking generally tracks the flow of data through the execution of the binary code in an attempt to guard against malicious software attacks. An attacker may breach protections of the computing device 100 through input channels of the computing device 100. The compiler 130 may generate code that associates a taint value to each register and memory byte. The taint value may be implemented as a Boolean value in which a high value denotes that the corresponding object (memory byte or register) is tainted and vice versa. In one embodiment, the compiler 130 may generate code that considers input channels spurious and values derived from such input channels as tainted. The flow of information from these tainted values is tracked and those values that are data dependent on such inputs are in turn marked tainted. Potential attacks are detected based upon the suspicious use of such tainted values.

Referring now to FIG. 2, original code is shown in the left column and illustrative code the compiler 130 may generate to track operation of the original code is shown in the right column. In particular, the original code begins at line 200 with a read operations that results in data received from a spurious input channel being stored at a memory location Mem. The compiler 130 may generate flow tracking code shown at line 200 that updates a taint value associated with the memory location Mem to reflect that the data stored at the memory location Mem is tainted. As mentioned above, the compiler 130 may consider data received via input channels as spurious and therefore tainted since such input channels may provide a point of entry for malicious attacks.

The original code at line 202 further loads the value stored at the memory location Mem into a register Reg1. In response to the original codes loading of register Reg1, the compiler 130 may generate tracking code at line 202 that updates a taint value associated with the register Reg1 to indicate that the value stored in the register Reg1 is tainted since the value in the register Reg1 is derived from the tainted value stored at memory location Mem. At line 204, the original code adds 2 to the tainted value of register Reg1 and stores the result in the register Reg2. The compiler 130 may generate tracking code at line 204 that updates the taint value associate with the register Reg2 to indicate that the value of register Reg2 is tainted since the value of register Reg2 is derived from the tainted value of register Reg1. Furthermore, the original code at line 206 may attempt to jump to the execution point specified by the value of register Reg2. However, the flow tracking code at line 206 may generate an exception to prevent the jump since compiler 130 generates flow tracking code that results in the computing device 100 determining that the target (i.e. value of register Reg2) of the execution point is tainted. In this manner, the compiler 130 may generate tracking code that may detect a potential security hole and invoke a proper response to the potential security breach.

Figure 3:
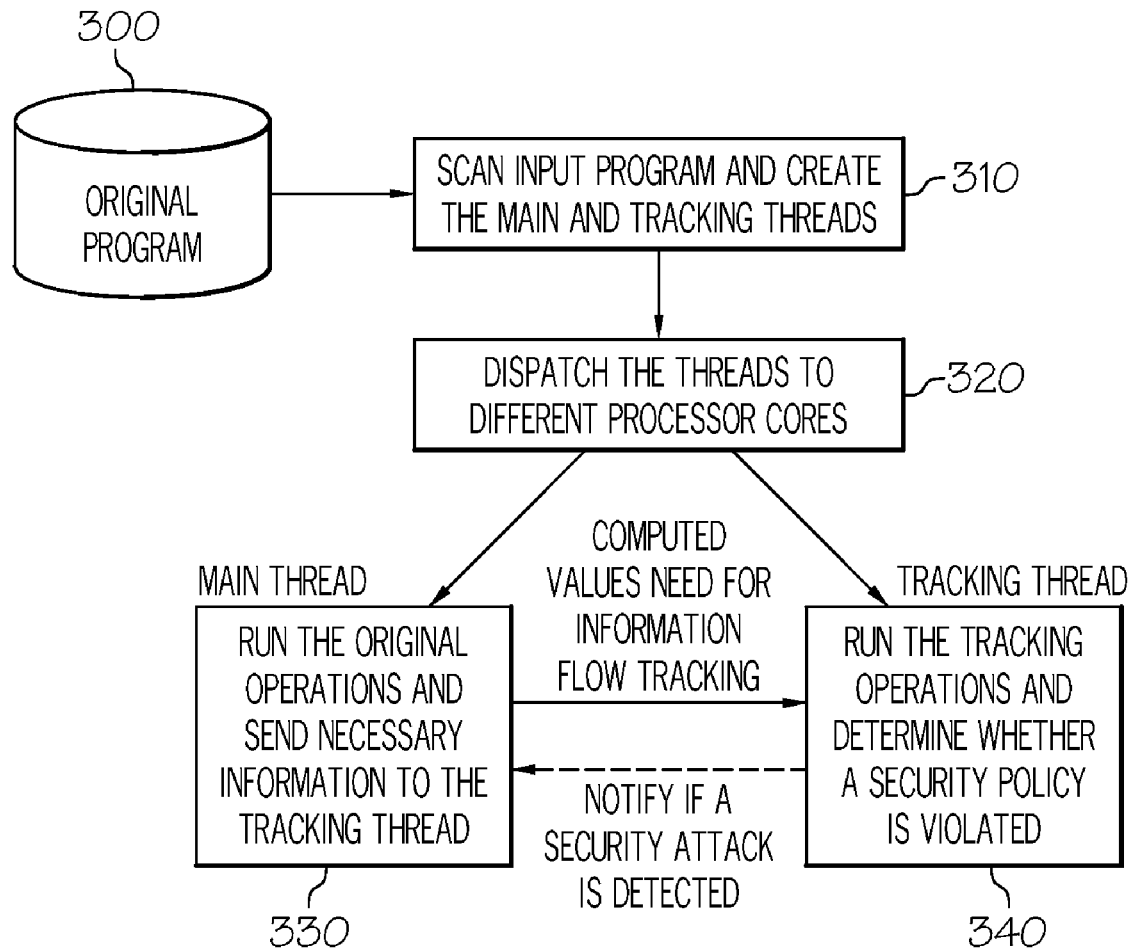
FIG. 3 shows an illustrative process of the compiler of FIG. 1 for generating information flow tracking code using a main thread and tracking thread.

Further details of information flow tracking are depicted in FIG. 3 and FIG. 4. FIG. 3 shows a process that may be implemented by the compiler 130 to generate a main thread to execute an original program 300 and a tracking thread to track the operations of the main thread. FIG. 4 shows an illustrative code snippet 400 of the original program 300 and corresponding main thread code 420 and tracking thread code 440 created by the compiler 130 from the illustrative code snippet 300.

As shown in FIG. 3, the compiler 130 at block 310 may scan the original program 400 and create main thread 420 and tracking thread 440. In particular, the compiler 300 may generate the main thread 420 such that the main thread 420 comprises the operations specified by the original program. The compiler 300 may also generate the tracking thread 440 to track operations of the main thread 420. As discussed in more detail below, compiler 130 may further generate code for the main thread 420 and the tracking thread 440 that establish a communications channel via which the main thread 420 and the tracking thread 440 may exchange data. In one embodiment, the compiler 300 may insert enqueue and dequeue operations into the main thread 420 and the tracking thread 440 to pass values therebetween.

At block 320, the main thread 420 and tracking thread 440 may be dispatched to different processing cores 103 of the computing device 100. In one embodiment, the main thread 420 and tracking thread 440 are dispatched to different processing cores 103 of the same processor 102; however, it should be appreciated that the threads 420, 440 may be dispatched to different processors 102 for execution. In yet another embodiment, the threads 420, 440 are dispatched to a single processing core 103 that provides multi-threaded support thus enabling efficient concurrent execution of the threads 420, 440 with a single processing core 103.

As shown, the main thread 420 at block 330 performs the original operations of the program 300. Furthermore, the main thread 420 may provide the tracking thread 440 with information that enables the tracking thread 440 to track the execution of the main thread 420. For example, the main thread 420 may provide the tracking thread 440 with register values of processing core 103 executing the main thread 420 that determine execution point targets of indirect jumps and/or indirect calls of the main thread 420. The main thread 420 may also provide the tracking thread 440 with branch outcome values of conditional jumps (e.g. taken/not taken bits) so the tracking thread 440 may follow branches taken by the main thread 420. Furthermore, the main thread 420 may provide the tracking thread 440 with addresses of register based memory operations to that the tracking thread 440 may track such memory operations.

Conversely, the tracking thread 440 at block 340 tracks the operations performed by the main thread 420 with the aid of the information received from the main thread 420. In particular, the tracking thread 440 may update taint values associated with registers of the processing core 103 executing the main thread 420. In particular, the compiler 130 may generate the tracking thread 440 such that each register of the processing core 103 that executes the tracking thread 440 holds the taint value for the corresponding register of the processing core 103 that executes the main thread 420. For example, the compiler 130 may generate the code of the tracking thread 440 such that the eax register of the tracking thread 440 holds the taint value of the eax register of the main thread 440.

The tracking thread 440 at block 340 may also update taint values associated with memory locations of the main thread 420. The compiler 130 may generate the code of the tracking thread 440 such that the tracking thread 440 stores taint values for memory locations of the main thread 420 in a linear translated memory space of the tracking thread 440. In particular, the compiler 130 may generate the tracking thread 440 such that tracking thread 440 stores taint values for each memory location Mem at memory location Mem+offset of the tracking thread 440 where offset is a linear address offset between the memory locations of the main thread 420 and the tracking thread 440. Thus, the above results in the taint value for each byte of the original address space of the main thread 420 being mapped to a byte of the address space of the tracking thread 440. In another embodiment, the taint value for each byte of the original address space of the main thread 420 is mapped to a one bit of the address of the tracking thread 440. Such a mapping may increase the complexity in locating the taint value for a specific byte of the main thread 420 and therefore possible introduce additional processing overhead. However, such a mapping may also greatly reduce the amount of memory used to store the taint values.

Moreover, the tracking thread 440 at block 340 may also notify the main thread 420 if any of the operations performed by or to be performed by the main thread 420 violate a specified security policy of the computing device 100. One security policy that the tracking thread 440 may enforce is that arguments of control-flow altering instructions (eg. register indirect jumps, return targets) should not be input dependent. In FIG. 2, this security policy corresponds to the check done for the instruction Jmp Reg2, where an exception is raised if Reg2 is tainted.

To better understand the information flow tracking code generation of the compiler 130 reference is made to FIG. 4 which shows original C code 400, main thread code 420 (shown in assembly) to be executed by a processing core 103 of the computing device 100, and tracking thread code 440 (also in assembly) to be executed by another processing core 103 of the computing device 100. At 450 of the original code 400, a choice from a user is received. As shown at 460, the received choice results in the call of one of three different functions. Although the received input is validated at 462, the main thread 420 still contains a buffer overflow vulnerability at 464.

The original code 400 at 450 indicates the computing device is to get an input value from a user and assign the input value to the variable choice. The compiler 130 based upon this "get" of the original code 400 may generate a call to a get routine at 470 which in turn results in the compiler 130 further generating a call to a sys_read routine at 471. The sys_read routine as shown at 472 results in the input value received from the user being stored at memory location <mem> and moved to the register eax of the main thread processing core 103. Based upon this "get" of the original code 400, the compiler 130 further generates code for the tracking thread 440 which enables the tracking thread to track the "get" operations of the main thread 420 and update taint values associated with registers and memory locations effected by the "get" operation accordingly. In particular, the compiler 130 may generate a call to a get routine at 480 to track the information flow in the get routine at 470 of the main thread 420.

The compiler 130 may further generate code at 481 that moves the value of 1 to the memory location <mem+off> in order to mark the corresponding memory location <mem> of the main thread 420 as tainted since the main thread 420 stores the user input value at the memory location <mem> as a result of the sys_read. The offset off refers to a linear translation between the original memory location <mem> of the main thread 420 and its corresponding memory location <mem+off> of the tracking thread 440 used to track the taint value for the memory location <mem>. Since the main thread 420 further stores the tainted value at memory location <mem> in the main thread processing core register eax, the compiler 130 further generates code for the tracking thread 440 shown at 482 that moves the taint value for memory location <mem> to the tracking thread processing core register eax, thus resulting in the taint value for the main thread processing core register eax indicating that the register eax is tainted.

At 462, the original code 400 defines a boundary check for the variable choice. As a result of this boundary check, the compiler 130 generates code at 474 that results in the main thread 420 validating the input value stored in main thread processing core register eax and exiting if the input value is greater than or equal to the boundary limit of 3. The compiler 130 also generates code at 484 that results in the tracking thread 440 detainting the main thread processing core register eax by moving the value 0 to the tracking thread processing core register eax. Thus, tracking thread 440 marks the value stored by the main thread processing core register eax as being not tainted since the main thread 420 validates the value of the main thread processing core register eax. Also, as shown in FIG. 4, the tracking thread 440 receives the branch outcome of the main thread's conditional jump to <exit>. The tracking thread 440 may use the received branch outcome to conditionally jump to corresponding code of the tracking thread 440 in order to continue tracking the operations of the main thread 420. It should be appreciated that the compiler 130 may generate code (not shown) for the main thread 420 and the tracking thread 440 that sends the branch outcome from the main thread 420 to the tracking thread 440 via a communications channel established between the two threads.

Now consider the spill code at 475 of the main thread 420 which stores the input value for choice of the processor register eax on the stack at a memory location <esp> which is defined by the stack pointer register esp of the main thread processing core. The tracking code at 485 similarly spills the taint value associated with the main thread processor register eax to a memory location <esp'+off>. Note that the corresponding stack pointer register esp of the tracking thread processing core in one embodiment contains the taint value of stack pointer register esp of the main thread processing core. Accordingly, for the tracking code to obtain the appropriate memory location for the taint value, the compiler 130 may generate the main thread 420 and the tracking thread 440 such that the value of the stack register esp is sent from the main thread 420 to the tracking thread 440.

Note that there is a buffer overflow vulnerability at 476 due to another call to the get routine. If the call to the get routine results in the buffer buf overflowing into the variable choice the tracking of the get routine at 486 would result in the variable choice being marked as tainted. Thus, when the variable choice is again brought into the main thread register eax at 477 and its courresponding taint value is brought into the tracking thread register eax at 487, the main thread register eax is marked as tainted by the tracking thread register eax if there was a buffer overflow as a result of the call to the get routine at 476.

As shown at 478, the main thread 420 may perform an indirect jump to a memory location defined by the main thread processing register eax. The tracking thread 440 at 488 may check whether the main thread processing register eax is tainted and notify the main thread 420 accordingly. As shown, the main thread 420 may receive the status check from the tracking thread 420. The compiler 130 may place code in the main thread 420 that results in the main thread 420 taking some sort of protective action in response to the tracking thread 440 determining that the main thread 420 is attempt to jump to an execution point derived from a tainted value.

It should be appreciated that various techniques may be used to reduce the amount data transferred between the main thread 420 and tracking thread 440. For example, the x86 instruction set allows memory addressing with the base and index registers. Several memory operations use the base pointer register ebp as the base register, due to the use of local variables in functions. Similarly, stack operations use the stack pointer register esp as the base register for addressing, albeit implicitly. For compiler generated code, dynamic information flow tracking operations involving these registers ebp, esp are not frequent. Thus, in one embodiment, the tracking thread 440 maintains the actual values of stack pointer esp and the base pointer ebp. Maintaining the actual values of these registers, reducing communications between the main thread 420 and the tracking thread 440 since the main thread 420 no longer needs to transfer the actual value of the stack pointer esp for stack operations and the base pointer (ebp) for memory operations involving local variables.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

What is claimed is:

1. A method comprising:
executing operations of a program with a main thread,
tracking the main thread's execution of the operations of the program with a tracking thread dynamically generated by a compiler or a binary translator,
updating, with the tracking thread, a taint value associated with a value of the main thread to reflect whether the value is tainted, including updating a first register of a first core that executes the tracking thread with the taint value, the first register associated with a first register of a second core that executes the main thread, the first register of the second core storing the value, the first and second cores being distinct cores, and
determining, with the tracking thread based upon the taint value, whether use of the value by the main thread violates a specific security policy, the method further including defining a memory offset that correlates memory locations of the main thread to memory locations of the tracking thread, storing the value at a memory location of the main thread, and storing the taint value at a memory location of the tracking thread that corresponds to the memory offset from the memory location of the main thread used to store the value.

2. The method of claim 1 further comprising:
receiving the value as input to the program via the main thread, and
determining that the value is tainted in response to the tracking thread determining that the main thread received the value as input.

3. The method of claim 1 further comprising:
receiving an input value to the program via the main thread,
updating, with the tracking thread, a taint value associated with the input value to indicate that the input value is tainted,
deriving the value of the main thread from the input value, and
determining that the value is tainted in response to the tracking thread determining that the main thread derived the value from the tainted input value.

4. The method of claim 1 further comprising:
receiving an input value to the program via the main thread,
updating, with the tracking thread, a taint value associated with the input value to indicate that the input value is tainted, validating the input value with the main thread,
updating, with the tracking thread, the taint value associated with the input value to indicate that the input value is not tainted in response to determining that the main thread validated the input value,
deriving the value of the main thread from the input value after the main thread validated the input value, and
updating, with the tracking thread, the taint value associated with the value of the main thread to reflect that the value is not tainted in response to the tracking thread determining that the main thread derived the value from no tainted values.

5. The method of claim 1 further comprising:
dispatching the main thread and the tracking thread to a multi-threaded processing core of a computing device.

6. The method of claim 1 further comprising:
dispatching the main thread to the first core, and
dispatching the tracking thread to the second core.

7. The method of claim 1 further comprising:
sending the tracking thread a register value of the main thread associated with an execution point target of the main thread, and
tracking execution flow of the main thread with the tracking thread based upon the received execution point target.

8. The method of claim 1 further comprising:
sending the tracking thread a branch outcome of the main thread associated with a conditional jump, and
tracking execution flow of the main thread with the tracking thread based upon the received branch outcome.

9. The method of claim 1 further comprising:
sending the tracking thread a memory address of the main thread associated with a register based memory operation, and
tracking the register based memory operation of the main thread with the tracking thread based upon the received memory address.

10. A non-transitory machine readable storage medium comprising a plurality of instructions, that in response to being executed, results in a computing device:
creating a main thread and a tracking thread for a program dynamically such that the tracking thread tracks operations performed by the main thread, updates a taint value associated with a value of the main thread, including updating a first register of a first core that executes the tracking thread with the taint value, the first register associated with a first register of a second core that executes the main thread, the first register of the second core storing the value, the first and second cores being distinct cores and determining based upon the taint value whether use of the value by the main thread violates a specified security policy, and defining a memory offset that correlates memory locations of the main thread to memory locations of the tracking thread, storing the value at a memory location of the main thread, and storing the taint value at a memory location of the tracking thread that corresponds to the memory offset from the memory location of the main thread used to store the value,
dispatching the main thread to the second core for execution, and
dispatching the tracking thread to the first core for execution.

11. The machine readable medium of claim 10, wherein the plurality of instructions further result in the computing device determining that a value of the main thread is tainted in response to the tracking thread determining that the main thread received the value as input.

12. The machine readable medium of claim 10, wherein the plurality of instructions further result in the computing device:
receiving an input value to the program via the main thread,
updating, with the tracking thread, a taint value associated with the input value to indicate that the input value is tainted,
deriving a value of the main thread from the input value, and
determining that the value of the main thread is tainted in response to the tracking thread determining that the main thread derived the value from the tainted input value.

13. The machine readable medium of claim 10, wherein the plurality of instructions further result in the computing device:
creating a communication channel between the main thread and the tracking thread, and
sending data from the main thread to the tracking thread that permits the tracking thread to track operations of the main thread.

14. A computing device, comprising:
a first processing core,
a second processing core distinct from the first processing core,
a memory to store taint values, and
a machine readable medium comprising a plurality of instructions, that in response to being executed, results in the computing device:
creating a main thread and a tracking thread for a program such that the tracking thread tracks operations performed by the main thread, updates taint values associated with a value of the main thread, including updating a first register of the first processing core that executes the tracking thread with the taint value, the first register associated with a first register of the second processing core that executes the main thread, the first register of the second processing core storing the value, and determining based upon the taint value whether use of the value by the main thread violates a specified security policy,
defining a memory offset that correlates memory locations of the main thread to memory locations of the tracking thread, storing the value at a memory location of the main thread, and storing the taint value at a memory location of the tracking thread that corresponds to the memory offset from the memory location of the main thread used to store the value,
dispatching the main thread to the second processing core for execution, and
dispatching the tracking thread to the first processing core for execution.

15. The computing device of claim 14 wherein a single processor comprises the first processing core and the second processing core.

16. The computing device of claim 14 wherein a first processor comprises the first processing core and a second processor comprises the second processing core.

17. The computing device of claim 14 wherein the plurality of instructions further result in the computing device determining that a value of the main thread is tainted in response to the tracking thread determining that the main thread received the value as input.

18. The computing device of claim 14, wherein plurality of instructions further result in the computing device:
   receiving an input value to the program via the main thread,
   updating, with the tracking thread, a taint value associated with the input value to indicate that the input value is tainted,
   deriving a value of the main thread from the input value, and
   determining that the value of the main thread is tainted in response to the tracking thread determining that the main thread derived the value from the tainted input value.

* * * * *